(12) United States Patent
Nino et al.

(10) Patent No.: US 10,665,359 B2
(45) Date of Patent: May 26, 2020

(54) OPTOELECTRONIC NUCLEAR BATTERIES BASED ON RADIONUCLIDE NANOENCAPSULATION AND ORGANIC PHOTODIODES

(71) Applicant: University of Florida Research Foundation, Inc., Gainesville, FL (US)

(72) Inventors: Juan Claudio Nino, Gainesville, FL (US); Paul M. Johns, West Palm Beach, FL (US); James Edward Baciak, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 15/709,782

(22) Filed: Sep. 20, 2017

(65) Prior Publication Data

US 2018/0033511 A1 Feb. 1, 2018

Related U.S. Application Data

(62) Division of application No. 14/916,697, filed as application No. PCT/US2014/061200 on Oct. 17, 2014, now abandoned.

(60) Provisional application No. 61/892,548, filed on Oct. 18, 2013.

(51) Int. Cl.
| | | |
|---|---|---|
| H01L 31/00 | (2006.01) |
| G21H 1/12 | (2006.01) |
| H02S 40/38 | (2014.01) |
| G21H 3/02 | (2006.01) |
| G21G 4/04 | (2006.01) |

(52) U.S. Cl.
CPC ............... *G21H 1/12* (2013.01); *G21H 3/02* (2013.01); *H02S 40/38* (2014.12); *G21G 4/04* (2013.01)

(58) Field of Classification Search
CPC ....................................................... G21H 1/12
See application file for complete search history.

(56) References Cited

U.S. PATENT DOCUMENTS

| | | |
|---|---|---|
| 5,137,659 A | 8/1992 | Ashley et al. |
| 5,443,657 A | 8/1995 | Rivenburg et al. |
| 5,721,462 A * | 2/1998 | Shanks ............ G21H 1/04 |
| | | 136/253 |
| 5,859,484 A | 1/1999 | Mannik et al. |

(Continued)

FOREIGN PATENT DOCUMENTS

| | | |
|---|---|---|
| EP | 0622811 A1 | 11/1994 |
| JP | 2004363076 A | 12/2004 |

(Continued)

OTHER PUBLICATIONS

Sims et al., "High Efficiency GaP Power Conversion for Betavoltaic Applications," Proceedings of the 13th Space Photovoltaic Research and Technology Conference (SPRAT 13); p. 373-382 (1994). (Year: 1994).*

(Continued)

*Primary Examiner* — Angelo Trivisonno
(74) *Attorney, Agent, or Firm* — Thomas | Horstemeyer, LLP (57) ABSTRACT

Embodiments of the present disclosure relate to compositions including a doped material, batteries including the composition, photovoltaic devices including the battery, and the like.

17 Claims, 4 Drawing Sheets

(56) References Cited

U.S. PATENT DOCUMENTS

| | | | |
|---|---|---|---|
| 8,134,216 | B2 | 3/2012 | Spencer et al. |
| 8,294,023 | B2 | 10/2012 | Clothier et al. |
| 2002/0121299 | A1 | 9/2002 | Vaz |
| 2006/0185723 | A1 | 8/2006 | Putnam |
| 2011/0100439 | A1 | 5/2011 | Clothier et al. |
| 2011/0241600 | A1 | 10/2011 | Kazem |

FOREIGN PATENT DOCUMENTS

| | | | | |
|---|---|---|---|---|
| JP | 2010098271 | A | 4/2010 | |
| WO | 9936967 | A1 | 7/1999 | |
| WO | WO 9936967 | A1 * | 7/1999 | ............... G21H 1/12 |
| WO | 2009103974 | A1 | 8/2009 | |

OTHER PUBLICATIONS

Kraft, "Doped Diamond: A Compact Review on a New, Versatile Electrode Material," Int. J. Electrochem. Sci., 2 (2007) 355-385 (Year: 2007).*

Steim et al., "Interface materials for organic solar cells," J. Mater. Chem., 2010, 20, 2499-2512 (Year: 2010).*

International Search Report for PCT/US2014/061200 dated Jun. 22, 2015.

English Translation of the Abstract for JP 2010098271 published on Apr. 30, 2010.

English Translation of the Abstract for JP 2004363076 published on Dec. 24, 2004.

Steinfelds, et al., "Development and Testing of a Nanotech Nuclear Dattery for Powering Mems Devices", Nuclear Technology, vol. 174, Apr. 2011, pp. 119-123.

Curtright, et al., "Power sources for nanotechnology", International Journal of Nanotechnology, vol. 1, Nos. 1/2, 2004, pp. 226-239.

Bhatti, et al., "Fast photoluminescence decay processes of doped ZnS phosphors at low temperature", Science Direct, Elsevier, Physica B 382 (2006) pp. 38-44.

Duggirala, et al., "High efficiency B radioisotope energy conversion using reciprocating electromechanical converters with integrated betavoltaics", Applied Physics Letters 92, 154104 (2008), American Institute of Physics.

Baxter, et al., "Nanoscale design to enable the revolution in renewable energy", Analysis, Energy & Environmental Science, 2009, 2, 559-588.

Lee, et al., "Development of nuclear micro-battery with solid tritium source", Applied Radiation and Isotopes 67 (2009) 1234-1238.

Steinfelds, et al., "Development and Testing of a Nanotech Nuclear Battery for Powering MEMS Devices", Nuclear Technology, vol. 174, Apr. 2011, pp. 119-123.

Yakubova, Galina Nikolayevna, "Nuclear Batteries with Tritium and Promethium-147 Radioactive Sources", Dissertation, University of Illinois at Urbana-Champain, 2010.

Walko, et al., "Electronic and Photonic Power Applications", Sand-90-2130C DE90 015567; Aug. 14, 1990.

Mirfayzi, S.R., "B-energy Analysis in 15P: Application to Betavolatics : A theoretical Analysis", Centre for Plasma Physics, School of Mathematics and Physics, Queen's University Belfast, Nov. 10, 2012.

Blanchard, Jake, "Radioisotope Batteries for MEMS", The University of Wisconsin, Jan. 2005.

Miley, George, et al., "Long lived, Low Power Betavoltaic Nuclear Battery for Electronics", 7th International Energy conversion Engineering Conference, Denver, Colorado, Aug. 2-5, 2009.

Huffman, et al., "Radioisotope Powered Cardiac Pacemakers", Cardiovascular Surgical Research Laboratories, Texas Heart Institute, Cardiovasc Dis Jan. 1974; 1(1): 52-60.

Prutchi, David, "Nuclear pacemakers", 2005.

* cited by examiner

OPTOELECTRONIC NUCLEAR BATTERIES BASED ON RADIONUCLIDE NANOENCAPSULATION AND ORGANIC PHOTODIODES

CLAIM OF PRIORITY TO RELATED APPLICATIONS

This application is a divisional application of and claims priority to U.S. patent application entitled: OPTOELECTRONIC NUCLEAR BATTERIES BASED ON RADIONUCLIDE NANOENCAPSULATION AND ORGANIC PHOTODIODES, having Ser. No. 14/916,697, filed on Mar. 4, 2012, which is a 35 U.S.C. § 371 national stage application of PCT Application No. PCT/US2014/061200, filed on Oct. 17, 2014, which claims priority to U.S. Provisional application entitled: DOPED MATERIALS, BATTERIES, AND PHOTOVOLTAIC CELLS, having Ser. No. 61/892,548, filed on Oct. 18, 2013, which is entirely incorporated herein by reference.

BACKGROUND

A nuclear battery is a device which includes a radiation source that acts in conjunction with a transducer which converts decay energy into an electric current. One of the most important concepts in nuclear battery design is establishing that the transducer dimensions match well with the particle mean free path such that maximum energy deposition is achieved. Many current optoelectronic nuclear battery designs involve a layered structure of alternating plates of radioisotopes, decay energy transducers, and photovoltaic (PV) cells. These layered designs introduce several interfaces at which efficiency loss occurs, as well as create mismatch between the transducer length and the particle range, which results in total device efficiency often less than 2%. Thus, there is a need to provide alternative solutions.

SUMMARY

Embodiments of the present disclosure relate to compositions including a doped material, batteries including the composition, photovoltaic devices including the battery, and the like.

An embodiment of the composition, among others, includes: a material doped including radioactive nuclides to form a doped material, wherein the doped material absorbs a radiation emission from the radioactive nuclides and re-emits a photon.

An embodiment of the battery, among others, includes: a composition including a material doped with radioactive nuclides to form a doped material, wherein the doped material absorbs a radiation emission from the radioactive nuclides and re-emits a photon.

An embodiment of the photovoltaic device, among others, includes: a battery, wherein the battery includes a composition including a material doped with radioactive nuclides to form a doped material, wherein the doped material absorbs a radiation emission from the radioactive nuclides and re-emits a photon.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2C illustrate three example doping mechanisms of the radionuclide nanoencapsulation (RANA) method: (1)

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of in organic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Prior to describing the various embodiments, the following definitions are provided and should be used unless otherwise indicated.

Discussion

Embodiments of the present disclosure relate to compositions including a doped material, batteries including the composition, photovoltaic devices including the battery, and the like. Embodiments of the present disclosure can be included in many types of devices since the battery is long lasting, the size and shape of the battery are variable, and/or the battery is biocompatible. In particular, embodiments of the present disclosure can be used in fields such as consumer electronics market, in vivo medical devices, applied nanotechnology power sources, and the like. One advantage includes use of the composition in a battery, where the battery carries out the energy conversion from radioactive emissions to light more efficiently and without the limitations of previous designs. In addition, batteries of the present disclosure can have a life time dependent on the half-life of the radionuclide source (up to 100 years or more), which is ideal for medical implanted devices. Furthermore, embodiments of the present disclosure can eliminate the interface between source and transducer used in the prior art.

In an embodiment, the composition includes doped materials that are doped with radioactive nuclides. Depending on the source of the radioactive nuclides, the majority of the energy from the decay process may be from beta (electron emission) or gamma (photon emission) decay, or include both a beta and gamma process for radioactive nuclides that emit both beta and gamma emissions. For beta emission, energy conversion from the emitted electrons to photons is established by doping pure beta-emitting radioisotopes into doped materials (e.g., fluorescent materials) that emit light while under irradiation. In an embodiment, fluorescent materials (e.g., phosphors, scintillators) can have the property of producing photons when energized by sources such as electron bombardment, so when doped with a beta emitter the electron source and photon generation site are only angstroms apart. For gamma emission, energy conversion from high energy gamma photons to lower energy photons is established by doping select gamma emitting radioisotopes into doped materials (e.g., fluorescent materials) that can re-emit the absorbed energy as lower energy photons. Doping the radioactive beta or gamma emitters directly into a single-phase translucent material, or dispersing the particles into a separate-phase translucent medium eliminates several of the major efficiency loss mechanisms introduced by layered designs where the different components are separated between layers as is presently done in the art.

Embodiments of the present disclosure provide a clear differentiation from the widely used "betavoltaic" design, in which a beta decay source is coupled to a semiconductive n-p junction device. Many currently used designs use a "layered" structure alternating between sheets of beta-emitting radioisotopes, phosphor materials, and PV cells, which reduces the amount of total energy converted from losses due to isotropic emission. Because of the mismatch between transducer sizes and the particle mean free path at various interfaces, energy transfer at each layer never reaches the external quantum efficiency of the transducer. These sources of efficiency loss are significantly reduced in embodiments of the present disclosure. An additional source of differentiation is that current technologies are inorganic, rigid, photodiodes, which are not conformable and can not be used in flexible photovoltaic.

Figure 1:
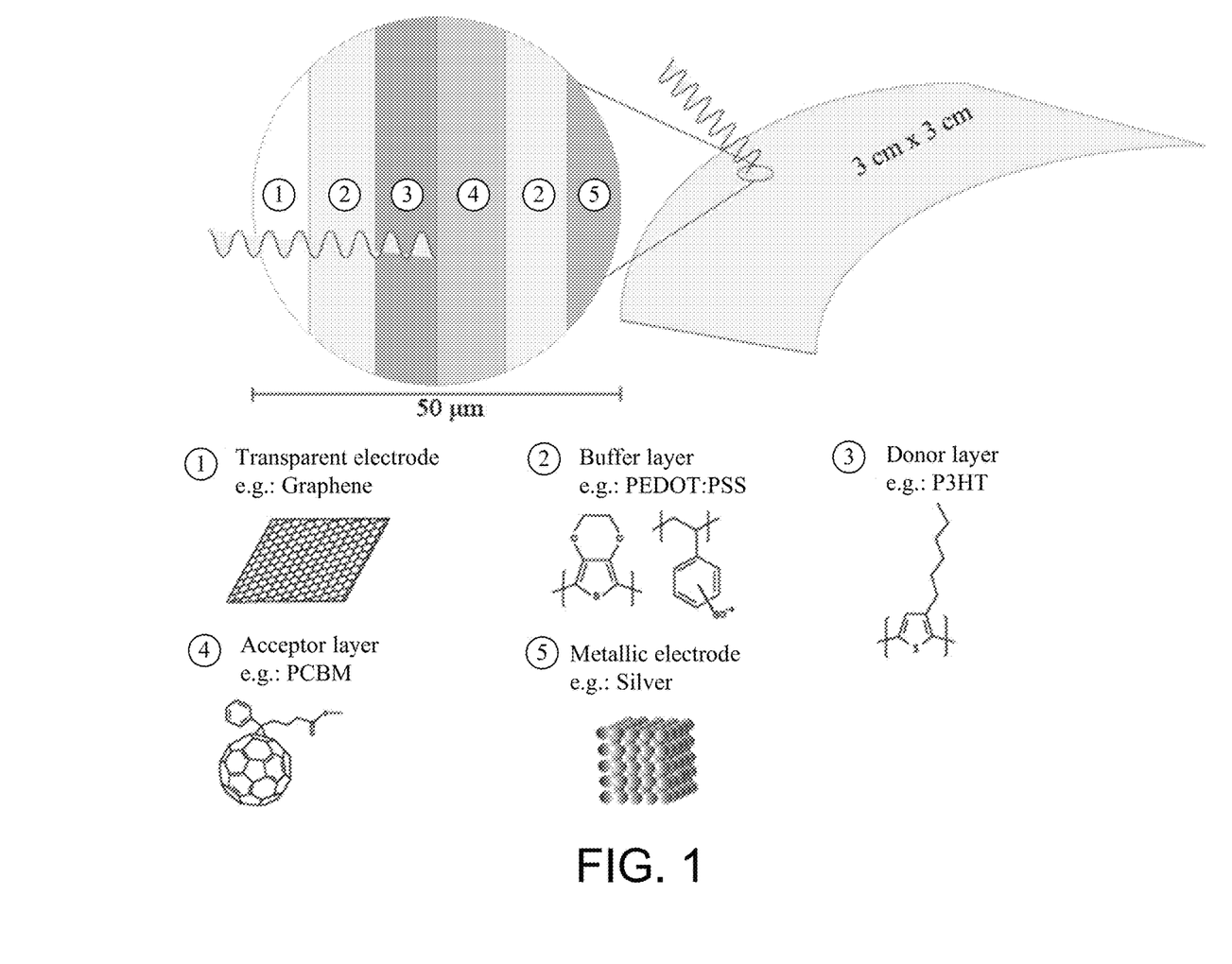
FIG. 1 illustrates an embodiment of a bilayer organic PV device structure, which serves as the photon-to-electric current transducer, where an exemplary arrangement of organic layers and corresponding example compositions are shown.

An example of an organic photovoltaic structure is shown in FIG. 1 and described in greater detail herein. Illustrated in FIG. 1 is an exemplary arrangement of layers of an organic photovoltaic and corresponding example compositions of the organic layers: (1) representing a transparent electrode e.g. Graphene; (2) representing buffer layers e.g. PEDOT:PSS; (3) representing a donor layer e.g. P3HT; (4) representing an acceptor layer e.g. PCBM; (5) representing a metallic electrode e.g. silver.

Figure 2A:
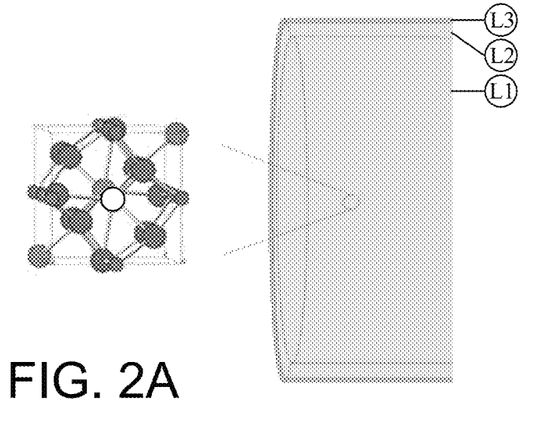
FIG. 2A depicts a substitutional radionuclide dopant within a crystalline lattice, (2)

In an embodiment, the radioactive nuclide in the doped material could reside in an interstitial (FIG. 2B) or atomic vacancy site (FIG. 2A). In general, doping atoms into fluorescent crystals has been done to introduce luminescence activators into the lattice. In an embodiment, the interstitial beta or gamma emitting radioisotopes could be either radioactive activator atoms or non-activator atoms residing within the crystal. In an embodiment, the gamma emitting nuclides used could reside interstitially or replace lattice vacancies.

Embodiments of the present disclosure are conformable and can be used in flexible (organic or mixed organic-nanocrystalline) photovoltaics. Flexible organic polymer-based photodiodes in particular are lower cost and easier to produce than current inorganic, rigid, photodiodes. An example of an organic photovoltaic structure is shown in FIG. 1 and described in greater detail herein. Illustrated in FIG. 1 is an exemplary arrangement of layers of an organic photovoltaic and corresponding example compositions of the organic layers: (1) representing a transparent electrode e.g. Graphene; (2) representing buffer layers e.g. PEDOT:PSS; (3) representing a donor layer e.g. P3HT; (4) representing an acceptor layer e.g. PCBM; (5) representing a metallic electrode e.g. silver.

Figure 2B:
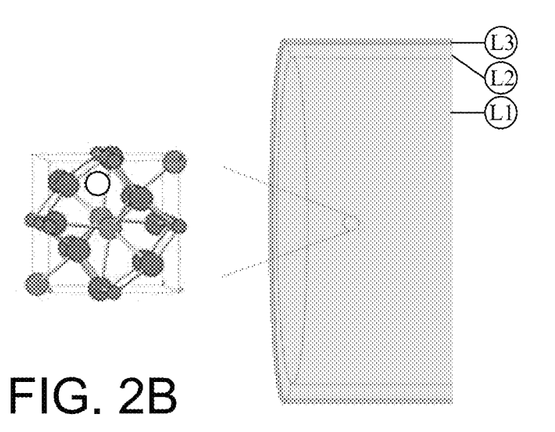
FIG. 2B depicts an interstitial substitution within a crystalline lattice, and (3)
Figure 2C:
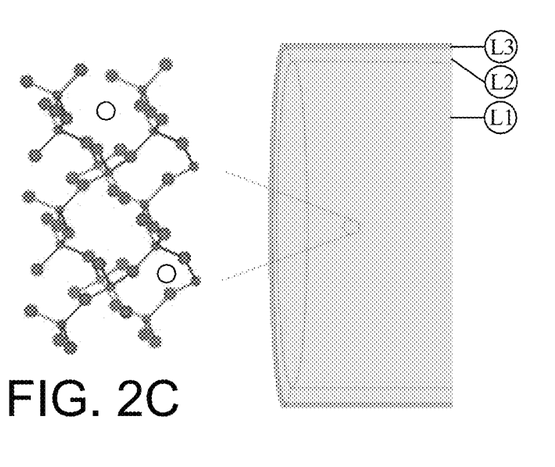
FIG. 2C depicts a radionuclide dopant in an amorphous material such as a glass or polymer.

In an embodiment, the doped materials can be made of a material that absorbs a beta emission (used with a beta emitting radioactive nuclide) and emits a photon or a material that absorbs a gamma emission and emits a photon (used with a gamma emitting radioactive nuclide). As shown in FIGS. 2A-2C are example doping mechanisms for the core composition in L1, with the dopants represented in white. FIG. 2A depicts a substitutional radionuclide dopant within a crystalline lattice. FIG. 2B depicts an interstitial substitution within a crystalline lattice. FIG. 2C depicts a radionuclide dopant in an amorphous material such as a glass or polymer. L2 is the flexible photon-to-electric current transducer and L3 is the outer electrode and shield.

In an embodiment, the material can include a fluorescent phosphor material that can absorb gamma or beta emissions. Phosphor materials are differentiated from other fluorescent materials through the process in which their excited electrons transition to a different spin state which must reverse before de-excitation. In an embodiment, the phosphor material can include: $Y_2O_3$:Eu, $ZnSiO_4$:Mn:$Sb_2O_3$, $SrB_4O_7$:Eu, (La,Ce)$PO_4$:Ce, (CeMg)$SrAl_{11}O_{18}$:Ce, (CeMg)$BaAl_{11}O_{18}$:Ce, $BaSi_2O_5$:Pb, (Y,Gd)$MgB_5O_{10}$:Ce,Pr, $La_2O_3$:Eu, (Y,Ce)$PO_4$:Ce, $BaMgAl_{10}O_{27}$:Eu:Mn, (La,Ce,Tb)$PO_4$:Ce:Tb, (Ce,Tb)$MgAl_{11}O_{19}$:Ce:Tb, $MgWO_4$, $Mg_4$(F)$GeO_6$:Mn, $CaWO_4$:Pb, $(Ba,Ti)_2P_2O_7$:Ti, $Sr_2P_2O_7$:Sn:Eu, $Sr_5F(PO_4)_3$:Sb:Mn, $(Ba,Mg)_2Al_{16}O_{27}$:Eu, $GdMgB_5O_{10}$:Ce:Tb, $YVO_4$:Bi:Eu, YAG:Ce:Cr:Nd (yttrium aluminum garnet), $MgSrAl_{10}O_{17}$:Eu:Cr, $BaMgAl_{10}O_{17}$:Eu, $Sr_5Cl(PO_4)_3$:Eu, $(Sr,Ba,Mg,Ca)_5Cl(PO_4)_3$:Eu, $Sr_6P_5BO_{20}$:Eu, $(Ca,Zn,Mg)_3(PO_4)_2$:Sn, $SrB_4O_7$:Sm:Eu, $(Sr,Mg)_3(PO_4)_2$:Sn, $CaSiO_3$:Pb:Mn, Cr—Yb doped fluorosilicate glass, ZnO—$LiYbO_2$, Yb doped glass ceramics containing ZnO nanocrystals, $LiYbMo_2O_8$:Pb, $CaLaGa_3S_6O$:Yb, Yb doped $LaSi_3N_5$, Ag—Yb co-doped oxyfluoride glasses, Yb-doped glass ceramics containing $YF_3$ nanocrystals, Cu doped glasses, Tb doped glasses, $LaVO_4$:Dy, Bi-doped oxide glasses, and combinations thereof.

In an embodiment, the doped material can include a fluorescent scintillator material that can absorb gamma or beta emissions. Scintillators are differentiated from other fluorescent materials through the process in which their excited electrons retain the same spin state before, during, and after excitation. In an embodiment, the scintillator material can include: $LiBaF_3$, $KMgF_3$, $KCaF_3$, $KYF_4$, $BaLu_2F_8$, $BaF_2$, CsF, RbF, $CeF_3$, $BaY_2F_8$:Ce, $BaLu_2F_8$:Ce, $CaF_2$:Eu, $LaF_3$:Ce, $LuF_3$:Ce, $CsCaCl_3$, $Li_3YCl_6$, $Cs_2NaCeCl_6$, $Cs_2LiYCl_6$, $LiYCl_6$:Ce, $CeCl_3$:Ce, $LuCl_3$:Ce, $K_2LaCl_5$:Ce, $RbGd_2Cl_7$:Ce, $Cs_2LiYCl_6$:Ce, $Cs_2NaLaCl_6$:ce, $Cs_2NaLuCl_6$:Ce, $Cs_3LuCl_6$:Ce, $CsLu_2Cl_9$:Ce, $LaCl_3$:Ce, $LuBr_3$:Ce, $CeBr_3$, $RbGd_2Br_7$:Ce, $RbLu_2Br_7$:Ce, $LaBr_3$:Ce, CsI, $CaI_2$, $HgI_2$, NaI:Tl, CsI:Tl, CsI:Na, $CaI_2$:Eu, LiI:Eu, $BiI_3$, CdS:Te, $Gd_2O_2S$:Pr:Ce:F, $Lu_2S_3$:Ce, $Lu_2O_2S$:Ce, BeO, $Y_2O_3$, $Y_3Al_5O_{12}$, $YAlO_3$, $Sc_2SiO_5$, $NaZrSiO_5$, $Lu_3(Al,Sc)_5O_{12}$, $CdWO_4$, $ZnWO_4$, $CaWO_4$, $CdWO_4$, $PbWO_4$, $Bi_3Si_4O_{12}$, $Bi_3Ge_4O_{12}$, $LiLuSiO_4$:Ce, $Rb_3Lu(PO_4)_2$:Ce, $K_3Lu(PO_4)_2$:Ce, $Gd_3Sc_2Al_3O_{12}$:Ce, $Y_5Al_5O_{12}$:Ce, $Y_5Al_5O_{12}$:Pr, $Lu_3Al_5O_{12}$:Sc, $Lu_3Al_5O_{12}$:Ce, $Lu_3(Al—Sc)_3O_{12}$:Pr, $YAlO_3$:Ce, $YAlO_3$:Pr, (Y,Lu)$AlO_3$:Ce, $GdAlO_3$:Ce, $LuAlO_3$:Ce, $Y_2SiO_5$:Ce, $Y_2SiO_5$:Pr, $Gd_2SiO_5$:Ce, $Lu_2SiO_5$:Ce, $Lu_2Si_2O_7$:Ce, $La_2Be_2O_5$:Ce, $LuBO_3$:Ce, $Li_6Gd(BO_3)_3$:Ce, plastic/organic scintillators, and a combination thereof. In an embodiment, the scintillator material can be a single crystal, nanocrystalline, or amorphous scintillator material. In an embodiment, the scintillating component of the material can be either doped into the translucent matrix (e.g., dopant concentrations in the ppm to few percent) or comprise the entire matrix (i.e., single crystal scintillator)). An example of doped material in amorphous material is shown in FIG. 2C.

In an embodiment, the doped material can form a homogeneous phase or can include discrete particles. In an embodiment, the doped materials which make up discrete particles can include doped micromaterials (or doped microparticles) or doped nanomaterials (or doped nanoparticles). In an embodiment, the doped discrete particles material can be spherical, substantially spherical, non-spherical, have a polygonal cross section, and the like. In an embodiment, the doped discrete micromaterials can have a longest dimension (e.g., diameter when the material is spherical or substantially spherical) of about 1 to 100 µm. In an embodiment, the doped discrete nanomaterials can have a longest dimension (e.g., diameter when the material is spherical or substantially spherical) of about 1 nm to 1 µm.

As mentioned above, the radioactive nuclide can be a beta emitter, a gamma emitter or a radioactive nuclide that is both a beta and gamma emitter. In an embodiment, the doped material can include more than one type (e.g., two types of beta emitter, a beta emitter and a gamma emitter, etc.) of radioactive nuclides. In an embodiment, the beta emitter can be one of the following: $^{63}$Ni, $^{32}$Si, $^{151}$Sm, $^{90}$Sr, $^{66}$Cu, $^{209}$Pb, $^{145}$Pr, $^{127}$Te, $^{121}$Sn, $^{66}$Ni, $^{210}$Bi, $^{169}$Er, $^{143}$Pr, $^{32}$P, $^{89}$Sr, $^{91}$Y, $^{188}$W, $^{35}$S, $^{123}$Sn, $^{45}$Ca, $^{249}$Bk, $^{106}$Ru, $^{171}$Tm, $^{147}$Pm, $^{85}$Kr, $^{3}$H, $^{113m}$Cd, $^{241}$Pu, $^{42}$Ar, $^{39}$Ar, $^{14}$C, $^{99}$Tc, $^{79}$Se, $^{10}$Be, $^{135}$Cs, $^{107}$Pd, $^{187}$Re, $^{115}$In, $^{113}$Cd, and a combination thereof. In an embodiment, the beta emitter can be introduced as a dopant (e.g., from ppb to a few percent) within the material.

Gamma ray emission is the result of excited nuclei returning to a stable energy state following an alpha or beta decay. While for practical purposes isotopes with half-lives between 1 and 100 years would be preferred, in an embodiment, for example, the gamma emitter can be a combination of the following nuclei that undergo alpha or beta (or other) decay and subsequently emit a gamma ray: $^{228}$Ac, $^{241}$Am, $^{124}$Sb, $^{125}$Sb, $^{126}$Sb, $^{137m}$Ba, $^{139}$Ba, $^{140}$Ba, $^{141}$Ba, $^{142}$Ba, $^{7}$Be, $^{211}$Bi, $^{213}$Bi, $^{213}$Bi, $^{214}$Bi, $^{82}$Br, $^{84}$Br, $^{11}$C, $^{47}$Ca, $^{141}$Ce, $^{143}$Ce, $^{144}$Ce, $^{134}$Cs, $^{134m}$Cs, $^{136}$Cs, $^{137}$Cs, $^{138}$Cs, $^{38}$Cl, $^{51}$Cr, $^{56}$Co, $^{57}$Co, $^{58}$Co, $^{60}$Co, $^{61}$Cu, $^{64}$Cu, $^{243}$Cm, $^{245}$Cm, $^{247}$Cm, $^{152}$Eu, $^{154}$Eu, $^{155}$Eu, $^{156}$Eu, $^{18}$F, $^{221}$Fr, $^{223}$Fr, $^{67}$Ga, $^{198}$Au, $^{166m}$Ho, $^{123}$I, $^{130}$I, $^{131}$I, $^{132}$I, $^{133}$I, $^{134}$I, $^{135}$I, $^{111}$In, $^{113m}$In, $^{192}$Ir, $^{59}$Fe, $^{85}$Kr, $^{85m}$Kr, $^{87}$Kr, $^{88}$Kr, $^{140}$La, $^{142}$La, $^{211}$Pb, $^{212}$Pb, $^{214}$Pb, $^{52}$Mn, $^{52m}$Mn, $^{54}$Mn, $^{56}$Mn, $^{203}$Hg, $^{99}$Mo, $^{147}$Nd, $^{237}$Np, $^{238}$Np, $^{239}$Np, $^{240}$Np, $^{57}$Ni, $^{65}$Ni, $^{95m}$Nb, $^{97}$Nb, $^{13}$N, $^{15}$O, $^{40}$K, $^{42}$K, $^{43}$K, $^{148}$Pm, $^{148m}$Pm, $^{149}$Pm, $^{151}$Pm, $^{231}$Pa, $^{233}$Pa, $^{234}$Pa, $^{233}$Ra, $^{224}$Ra, $^{226}$Ra, $^{219}$Rn, $^{105}$Rh, $^{106}$Rh, $^{103}$Rh, $^{89}$Rb, $^{105}$Ru, $^{97}$Ru, $^{153}$Sm, $^{44}$Sc, $^{47}$Sc, $^{46}$Sc, $^{48}$Sc, $^{75}$Se, $^{110}$Ag, $^{110m}$Ag, $^{111}$Ag, $^{22}$Na, $^{85}$Sr, $^{87m}$Sr, $^{91}$Sr, $^{92}$Sr, $^{101}$Tc, $^{99m}$Tc, $^{129}$Te, $^{129m}$Te, $^{131}$Te, $^{131m}$Te, $^{132}$Te, $^{133}$Te, $^{133m}$Te, $^{134}$Te, $^{135}$Te, $^{160}$Tb, $^{169}$Tb, $^{180}$Tb, $^{89}$Tb, $^{201}$Tl, $^{208}$Ti, $^{209}$Ti, $^{227}$Th, $^{229}$Th, $^{125}$Sn, $^{187}$W, $^{235}$U, $^{237}$U, $^{48}$V, $^{131}$Xe, $^{133m}$Xe, $^{135}$Xe, $^{138}$Xe, $^{169}$Yb, $^{92}$Y, $^{93}$Y, $^{65}$Zn, and $^{97}$Zr. In an embodiment, the gamma emitter can be introduced as a dopant (e.g., from ppb to few percent) within the material.

In an embodiment, the radionuclide-doped material may be optically transparent. In an embodiment, the doped materials (e.g., doped microparticles or doped nanoparticles) can be dispersed within a transparent material (transparent material composite), where the transparent material is transparent to emitted photons and/or the radiation emission. For example, the transparent material may have the properties of shielding the device (e.g., PV cells) from any escaped high energy beta or gamma emissions, while allowing the emitted photons to interact with the PV cell.

In an embodiment, the transparent material can include a low atomic number polymer and/or a glass material. In an embodiment, the polymer can include low density polyethylene, high density polyethylene, polypropylene, polystyrene, polytetrafluoroethylene, polyvinylchloride, polychlorotrifluoroethylene, or a combination thereof. In an embodiment, the glass material can include glasses formed from the glass formers B, Si, Ge, Al, B, P, V, As, Sb, and/or Zr, glasses formed from the intermediate formers Ti, Zn, Pb, Al, Th, Be, Zr, and/or Cd, or a combination of these glasses.

As mentioned above, the doped material or the transparent material composite can be used in a battery. In an embodiment, the battery can be surrounded with a photovoltaic device, an embodiment of which is described below. In this regard, radioactive decay can be converted into energy, such as light energy. An advantage of the present disclosure is that the doped material or the transparent material composite can have various shapes, which permits its use in many types/sized devices unlike other nuclear batteries designs. In an embodiment, the battery can be used in MEMS devices, pacemakers, micro-robotics, or telemetry in prosthetics.

In an embodiment, the radioactive nuclides can be directly doped into nanoparticles or nanoclusters of a material that can convert and/or multiply radioisotope decay emissions into photons. In an embodiment, the doped nanoclusters can be made into a transparent form or dispersed into a transparent material to form a transparent nanomaterial composite. In an embodiment, the transparent nanomaterial composite can be wrapped in a PV cell of a designated geometry. Whereas a typical betavoltaic design will include several layers of energy emitters and collectors in the form of flattened foils, embodiments of the present disclosure reduce the electric current generation process to one interface between the PV cell and the transparent nanoparticle composite. Additionally, by using chemical synthesis techniques (co-precipitation, etc.) to create spherical, nano-sized particles of the photon emitters, a higher surface area is achieved to interact with the PV cell. In an embodiment, the PV cells are flexible so that various geometries are allowed, so that in one example, the PV cell can be wrapped around a cylindrical shaped transparent nanomaterial composite. Consequently, embodiments can take on a variety of shapes and used for a large number of specific applications where the geometry of the transparent nanomaterial composite can be tailored for the specific application.

Figure 3:
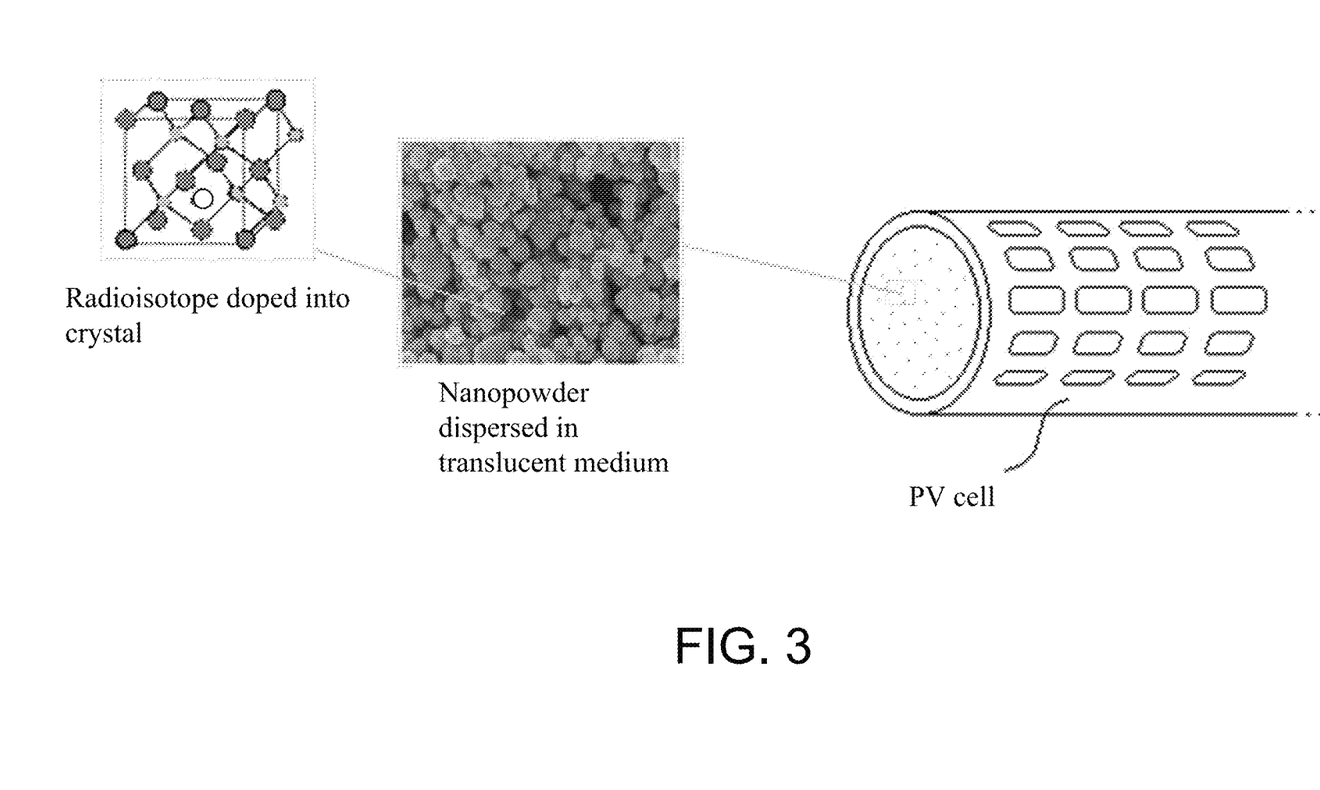
FIG. 3 illustrates an embodiment of a core material wrapped with a PV cell, the nanopowder doped into a translucent medium, and the radioisotope doped into a crystal structure.

In an embodiment, the PV electricity generation mechanism used in embodiments of the present disclosure can be similar to conventional solar cells with the exception that the photons are being initiated by phosphorescence or scintillation that comes from the decay of a radioactive nuclide as opposed to the sun. As mentioned above, the PV cell can be wrapped around the transparent nanomaterial composite so that the photons produced by the doped material (e.g., phosphor or scintillator materials) are capable of being absorbed regardless of scattering angle. FIG. 3 illustrates an embodiment of a PV device structure, where the core material wrapped with a PV cell. As shown, the example core comprises a nanopowder doped into a translucent medium. An example structure of a radioisotope (represented in white) doped into a crystal structure is also shown.

Figure 4:
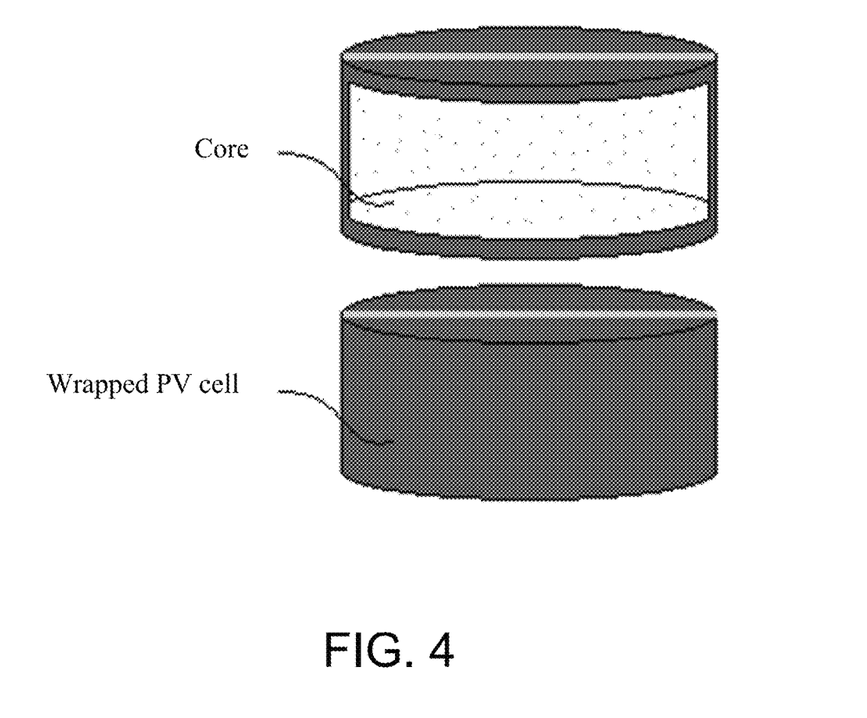
FIG. 4 illustrates a pair of devices, showing the core material wrapped with a PV cell in a stacked configuration.

In addition to wrapping the PV cell circumferentially, a top-bottom electrode approach can be used to effectively stack cells and add to the current produced, as shown in FIG. 4.

Example 1

Developments in organic photodiode technology have led to a new class of organic photovoltaics (OPVs) that exhibit flexibility, high quantum efficiency, broad spectral coverage, and transparency to X-rays and gamma rays [1]. These thin polymer-based photovoltaic cells consist of layers of photon absorbing and electron donating materials that are surrounded by a conducting buffer material. Because OPV cells can be fabricated with component layers on the order of tens of microns, flexible cells can be wrapped around curved surfaces or deposited onto complex shapes that are incompatible with traditional silicon based photovoltaics. Similar to how a commercial solar cell collects sunlight to generate current, OPVs can also interact with the light emitted by scintillator or phosphor materials. This opens the door for a number of nuclear related electronic applications.

For example, by coupling nuclear electronics know how with OPVs, both radiation detectors and nuclear batteries can be enhanced to yield more lightweight and conformable designs. In the case of radiation detection systems based on radiation-induced scintillation, these are traditionally coupled with photomultiplier tubes that are expensive to produce, bulky, and fragile. Therefore, wrapping a scintillator with an OPV material can allow for more lightweight, compact, and lower power consuming alternative to photomultiplier tubes. Additionally, OPV materials allow tunable spectral properties based on the band gap of the chosen polymer to tailor absorptivity of the OPV to the emitted wavelength of the detector crystal [2].

Apart from improving detector technology, OPVs can allow novel design concepts for isotope-based power cells. Batteries with high energy density, conformable geometry, and long-term reliability are needed to power implantable biomedical devices, micro- and nano-scale technology, and remote systems. Nuclear batteries that rely on the collection of light produced by phosphor materials can benefit from OPVs through better efficiencies driven by the photodiode being wrapped around the device. Photon assisted radioisotope-powered batteries aim to overcome design challenges that face betavoltaic battery designs, which are often limited by efficiencies less than 2% [3] [4]. The limited use of current semiconductor based nuclear batteries stems from constraints on battery size and efficiency; both of which can be improved by incorporation of recently developed OPV technologies.

In the Example, aspects of coupling nuclear electronics with OPVs are investigated. To survey radiation effects within OPV cells, the Monte Carlo N-Particle code MCNP6 was used to simulate embodiments of OPV based detectors and batteries under different radiation conditions. Specifically, the effect of radiation on organic material and attenuation on device efficiency is discussed.

Organic Photovoltaics:

While there are several variations of OPV designs, an organic photovoltaic cell used in conjunction with a scintillating medium typically consists of three component layers (e.g., donor layer, acceptor layer, and buffer layer) placed between a metallic and transparent electrode as shown in FIG. 1.

Photons that pass through the transparent electrode interact at the junction of an organic donor material that generates holes and an acceptor material that generates electrons. These electron-hole pairs, known as excitons, separate and transfer charge throughout the cell. Donor and acceptor materials should exhibit narrow band gaps to enable a wide spectral absorptivity, and distant electronic potential values between the highest occupied molecular orbital (HOMO) to the lowest unoccupied molecular orbital (LUMO) levels to drive voltage bias. A buffer material is also used to enhance conductance and block charge leakage. FIG. 1 illustrates example compositions for each of the transparent electrode layer, donor layer, acceptor layer, and buffer layer. An example composition for a metal conducting electrode is also shown.

A transparent bottom electrode is needed to lead the circuit without impeding the photons from reaching the interior layers of the cell. Graphene is an attractive electrode material for OPV devices, as it exhibits high electron mobility while maintaining >80% optical transmittance [5]. Materials fitted with graphene electrodes have also exhibited radiation damage reduction from electron beam characterization methods in devices in which they are used. Zan et al. showed that electron microscopy imaging of materials sandwiched between two thin graphene layers exhibit a lower defect generation rate than other methods of preparing samples [6].

Donor materials optimally have low band gap energies so that exciton generation can be achieved with lower energy photons. The polymer poly(3-alkylthiophene), or P3HT, shows promise as a donor material for detectors or batteries that are based on materials that fluoresce by the presence of the activators $Er^{3+}$ and $Ce^{3+}$, as the polymer's absorption spectra of 500-650 nm falls within the typically red/yellow emission of $Er^{+3}$ and $Ce^{3+}$. Mikroyannidisa et al. exhibited that conjugated small molecules with a 300 to 750 nm absorption band can be fabricated into OPV cells, which shows wide emission spectra materials can be incorporated with OPV technology as well [7].

Acceptor materials are widely based on the carbon-based fullerene structures, although to improve solubility an ester compound is typically added to the allotrope [8]. Two commonly utilized acceptor polymers, $PC_{60}BM$ and $PC_{70}BM$, exhibit absorption in the 200-350 nm wavelength range, making them compatible with the blue light emitting $Gd^{3+}$ activated materials. Additive compounds joined to the fullerenes can shift the bandgap and modify the absorption spectra. Additionally, better cell efficiencies through higher LUMO levels can be achieved at the expense of solubility with indene-fullerene adducts [2].

Because acceptor and donor layers do not typically carry charge well, the buffer layer of an OPV is used to drive electrons and holes to the respective electrodes. Buffer materials commonly consist of a mix of two ionomers, one that transports electrons while blocking holes, and another that performs the opposite function. A widely used OPV buffer material is a mix of sulfonated polystyrene (which enhances electron mobility) and poly(3,4-ethylenedioxy-thiophene) (which enhances hole mobility), that when used together is known as PEDOT:PSS. Ongoing research to improve cell efficiency has shown that conductance can be improved through organic solvent additives [8] [9].

Efficiencies for OPV cells have always lagged inorganic crystalline semiconductors. Historically, OPV efficiencies have been below 5%; however, during 2012 alone the efficiency of commercially produced organic photovoltaics jumped from 10.7% to 12% in the span of nine months, and it has been projected that 15% efficiency will be reached by 2015 [10]. Higher efficiencies of up to 12% have also been reached from dye-sensitized cells, in which nanoparticles of inorganic semiconducting materials are dispersed into polymer dyes. These advances in cell efficiencies have opened up OPV technology to application beyond traditional solar power.

Given the importance of these materials, they were chosen as the representative layers for the MCNP simulations in the present work. Polymer processing techniques such as chemical vapor deposition allow for the thicknesses of each component layer in an OPV cell to be on the order of several microns. In a 50 pin thick OPV cell, each deposited organic layer may be up to 10 pin thick to allow for versatile and flexible photodetectors. In comparison, silicon photodiodes may have thicknesses on the order of 200-500 μm.

Additionally, the effect of ionizing radiation on these OPV components must be considered toward the overall attractiveness of the material for a nuclear application. As in most polymers, ionizing radiation can reduce chain length of the acceptor, donor, and buffer materials, which will reduce the overall efficiency of the cell.

Figure 5:
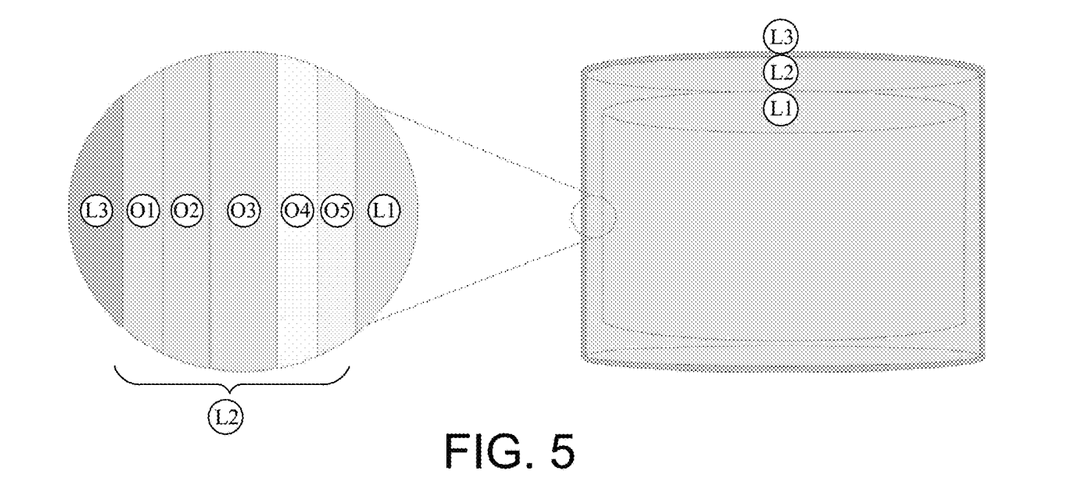
FIG. 5 illustrates an embodiment of a (radionuclide nanoencapsulated) RANA cell with representative materials, where L1 is the radionuclide-doped fluorescent medium, L2 (O1-O5) is the flexible photon-to-electric current transducer, and L3 is the outer electrode and shield.

FIG. 5 illustrates an embodiment of radionuclide nano-encapsulation cell with representative materials, where L1 is an example radionuclide-doped fluorescent medium, L2 is the flexible photon-to-electric current transducer with O1-O5 representing the organic layers, and L3 is the outer electrode and shield.

MCNP Simulation:

The Monte Carlo software MCNP6 was used to simulate a radiation detector equipped with an organic photodiode as well as an OPV-wrapped phosphor battery. Energy deposition data was analyzed to determine whether OPV systems would require any shielding layers between the scintillating material and the OPV.

It is clear that MCNP does not take into account bonding, molecular structure, or the functional shapes of the materials under consideration. For instance, the $C_{60}$ fullerene structure appears the same as graphene within the simulation. That being said, MCNP still provides valuable insight into the matter-related interactions between the radiation and the OPV components. Scintillator Detector Simulation:

A 3×3 inch NaI(Tl) crystal wrapped with an OPV layer was simulated to find the energy deposition in the organic photovoltaic layer in a traditional detection situation. NaI (Tl) is a well-developed scintillator with a 6.5% R value at 62 keV, and in practice it would be beneficial to compare the spectral resolution from an OPV wrapped NaI(Tl) system with traditional photomultiplier tube resolution data. The materials represented by the OPV layers were graphene (top electrode), P3HT (donor), $PC_{60}BM$ (acceptor), PEDOT:PSS (buffer) and Ag (bottom electrode). The thickness of each layer was modeled as 10 μm, with the entire surface area of the detector covered. A $^{137}Cs$ and $^{60}Co$ source 3 cm away from the detector (for a solid angle of 3.98 Sr.) were chosen as the radionuclides for the model. The MCNP6*F8 tally was used to generate the energy deposition data.

Energy deposition results are shown in Table I. On a per-particle basis from the 662 keV gamma emissions of $^{137}Cs$, each of the organic layers received between 398 eV and 18 eV from the radiation. Likewise, the 1.172 MeV and 1.333 MeV gamma rays from the $^{60}Co$ source deposited between 400 eV and 27 eV to the OPV layers. Based on the MCNP*F8 tallies, energy deposition in the organic layers did not increase monotonically with increasing photon energy.

TABLE I

Energy deposition in an OPV wrapped NaI(Tl) detector from representative $^{60}Co$ and $^{137}Cs$ sources.

| Composition | $^{137}Cs$ Energy Deposition [MeV] | $^{60}Co$ Energy Deposition [MeV] |
| --- | --- | --- |
| Detector Crystal | 1.1668 $10^{-1}$ | 1.7324 $10^{-1}$ |
| Graphene | 3.9820 $10^{-4}$ | 4.0001 $10^{-4}$ |
| PEDOT:PSS | 1.1414 $10^{-5}$ | 2.9994 $10^{-5}$ |
| P3HT | 2.5163 $10^{-5}$ | 3.8356 $10^{-5}$ |
| $PC_{60}BM$ | 2.0575 $10^{-5}$ | 2.9279 $10^{-5}$ |
| PEDOT:PSS | 1.8405 $10^{-5}$ | 2.7806 $10^{-5}$ |

It is clear that significant radiation damage to OPV polymer constituents can reduce the effective chain length, which lowers the efficiency of the acceptor and donor in generating charges. However, the MCNP energy deposition tallies show that not surprisingly, the graphene layer absorbs the majority of radiation in the OPV cell. Although, as stated before, no molecular structure information is considered in the simulation, it is important to note that the threshold for knock-on radiation damage in graphene begins at approximately 80 keV [11]. This is several orders of magnitude higher than the 398 eV energy deposition found in the MCNP simulation.

The effect of radiation exposure on OPV devices has been demonstrated at high doses and is well understood for P3HT/PCBM systems. Kingsley et al. exposed a P3HT/PCBM blend to a 4.2 kGy dose over 3 hours to show an 35% drop in photocurrent [12], and Li et al. demonstrated an efficiency drop of 4.1% to 2.2% after a 1 hour exposure [13]. Additionally, recovery of cell efficiency post-irradiation was shown to occur in the work by Li. We conclude that localized energy deposition from radiation in the buffer and the active acceptor and donor layers from a radiation detection scenario will not likely significantly damage the integrity of the material. Battery Simulation:

Microscopic nuclear battery designs hold promise for improving the state of nanotechnology. An MCNP simulation inspired by the battery embodiment found in Steinfelds and Tulenko [3] was used to simulate energy deposition in the OPV layers. A modification to the referenced design was made by representing the battery's ZnS phosphor as evenly doped with a dispersed $^{63}$Ni beta emitter. Because the short path length of beta particles in ceramic solids is containable to several microns, the radionuclide $^{63}$Ni is able to serve as a low-leakage source for fluorescence in the ZnS.

The battery dimensions were modeled as a cylinder with a 450 μm diameter and a 450 μm radius, wrapped with the 10 μm thick OPV layers described in the detector simulation. A volumetric source was used so that the core of the battery was evenly distributed with the nuclide. Comparative data between the $^{63}$Ni max energy 66.9 keV beta particle emission and the average 17 keV emission are presented in Table II. Again, the MCNP6*F8 tally was used to generate the energy deposition data, but the particle tracking energy cutoff was lowered to 1 eV for the lower energy beta particles.

| Composition | Max Energy Deposition [MeV] | Average Energy Deposition [MeV] |
| --- | --- | --- |
| Battery Core | 6.4821 10$^{-2}$ | 1.6942 10$^{-2}$ |
| Graphene | 1.2798 10$^{-4}$ | 2.2308 10$^{-5}$ |
| PEDOT:PSS | 3.5716 10$^{-4}$ | 1.7915 10$^{-5}$ |
| P3HT | 3.4185 10$^{-4}$ | 1.1091 10$^{-5}$ |
| PC$_{60}$BM | 1.9028 10$^{-4}$ | 4.2255 10$^{-6}$ |
| PEDOT:PSS | 1.5416 10$^{-4}$ | 2.0987 10$^{-6}$ |

Based on the results from Table II, the maximum energy deposited into the organic layers of the device was nearly a magnitude higher than the energy deposited into the OPV wrapped around the detector in the prior simulation. However, since the majority of particles are born within the bulk of the ceramic and do not make it to the OPV layers, the average energy data represents a more realistic energy deposition model. In the 17 keV average beta particle case, the energy deposited on a per-particle basis was between 22 eV and 2 eV, showing that radiation damage from most $^{63}$Ni beta decays is irrelevant to the organic layers. Beta particles escaping the phosphor core with energy on the magnitude of a few eV can potentially directly contribute to the current generated by the OPV cell.

CONCLUSIONS

Although energy deposition from ionizing radiation can increase dark current and lower cell efficiency in OPV components, the benefit of micron-sized polymer thickness and low-Z atomic composition makes OPV cells competitive with traditional crystalline photovoltaics for detecting the presence of ionizing radiation. Apart from the typical structural shielding found in detector systems, additional shielding for specifically protecting the OPV cell from radiation damage is not deemed necessary. MCNP data showed that on a per-particle basis, detectors wrapped with an OPV cell exhibit energy deposition from ionizing radiation on the range of tens to several hundred eV. Based on this, it is anticipated that radiation damage during an in-field deployment will not dramatically affect the longevity of an OPV based device.

Likewise, a nuclear battery concept based on a $^{63}$Ni beta emitter dispersed throughout a phosphor material wrapped in an OPV cell exhibited good radiation tolerance. The average $^{63}$Ni beta emission created energy deposition of less than 23 eV on a per-particle basis. Future work inspired by the MCNP simulations of OPV wrapped nuclear electronic technology will aim to create embodiments of the simulated devices to characterize system performance as a function of exposure.

EXAMPLE 1 REFERENCES

[1] J. D. MEYERS and J. XUE, "Organic semiconductors and their applications in photovoltaic devices", Polymer Reviews, 52, 1 (2012).

[2] JIANHUI HOU and XIA GUO, *Organic Solar Cells*, Springer, (2013).

[3] E. V. STEINFELDS and J. TULENKO, "Development and Testing of a Nanotech Nuclear Battery for Powering MEMS Devices," Nuclear Technology, 174, 119 (2011).

[4] T. WACHARASINDHU, J. W. KWON, D. E. MEIER, and J. D. ROBERTSON, "Radioisotope Microbattery Based on Liquid Semiconductor," Appl. Phys. Lett., 95, 193 (2009).

[5] WENJING HONG, YUXI XU, GEWU LU, CHUN LI, and GAOQUAN SHI, "Transparent Graphene/PEDOT-PSS Composite Films as Counter Electrodes of Dye-sensitized Solar Cells," Electrochemistry Communications, 10, 1555 (2008).

[6] R. ZAN, Q. M. RAMASSE, R. JALIL, T. GEORGIOU, U. BANGERT, K. S. NOVOSELOV, "Control of Radiation Damage in MoS2 by Graphene Encapsulation," ACS Nano, 7, 10167 (2013).

[7] J. A. MIKROYANNIDISA, D. V. TSAGKOURNOSA, S. S. SHARMAD, Y. K. VIJAYE, and G. D. SHARMA, "Conjugated Small Molecules with Broad Absorption Containing Pyridine and Pyran Units: Synthesis and Application for Bulk Heterojunction Solar Cells," Organic Electronics, 11, 2045 (2010).

[8] O. P. DIMITRIEV, D. A. GRINKO, Y. V. NOSKOV, N. A. OGURTSOV, A. A. PUD, AA, "PEDOT:PSS Films-Effect of Organic Solvent Additives and Annealing on the Film Conductivity," Synthetic Metals, 159, 2237 (2009).

[9] A. KEAWPRAJAK, W. KOETNIYOM, P. PIYAKULAWAT, K. JIRAMITMONGKON, S. PRATONTEP, U. ASAWAPIROM, "Effects of Tetramethylene Sulfone Solvent Additives on Conductivity of PEDOT:PSS Film and Performance of Polymer Photovoltaic Cells," Organic Electronics, 14, 402 (2013).

[10] Heliatek, "Heliatek Consolidates its Technology Leadership by Establishing a New World Record for Organic Solar Technology with a Cell Efficiency of 12%," Press Release, Heliatek GmbH (2013).

[11] J. ZUBELTZU, A. CHUVLIN, F. CORSETTI, A. ZURUTUZA, and E. ARTACHO, "Knock-on Damage in Bilayer Graphene: Indications for a Catalytic Pathway," Physical Review B, 88, 245407 (2013).

[12] J. W. KINGSLEY, S. J. WESTON, D. G. LIDZEY, "Stability of X-Ray Detectors Based on Organic Photovoltaic Devices," IEEE Journal of Selected Topics in Quantum Electronics, 16, 1770 (2010).

[13] G. LI, Y. YANG, R. A. B. DEVINE, C. MAYBERRY, "Radiation Induced Damage and Recovery in Poly(3-hexyl thiophene) Based Polymer Solar Cells," Nanotechnology, 19, 424024 (2008).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A photovoltaic device, comprising:
   a core comprising a composition including a homogeneous mixture of a material doped with radioactive nuclides to form a homogeneous doped material, wherein the homogeneous doped material absorbs a radiation emission from the radioactive nuclides and re-emits a photon, the core formed with an outer surface wherein the homogeneous doped material is transparent to the photon;
   a transparent material, wherein the homogeneous doped material is disposed within the transparent material, wherein the transparent material is transparent to photons, wherein the transparent material and the homogeneous doped material are not the same material; and
   an organic photovoltaic cell, wherein the core and the organic photovoltaic cell have a core-shell structure where the outer surface of the core is wrapped with the organic photovoltaic cell so that the entire core is within the organic photovoltaic cell and wherein the photovoltaic cell is disposed only on the outer surface of the core so that re-emitted photons produced by the homogeneous doped material are captured by the photovoltaic cell regardless of scattering angle.

2. The photovoltaic device of claim 1, wherein the transparent material is selected from: a glass or a polymer, wherein the glass is formed from a glass former selected from the group consisting of: B, Si, Ge, Al, B, P, V, As, Sb, Zr, and a combination thereof, or the glass is formed from an intermediate former selected from the group consisting of: Ti, Zn, Pb, Al, Th, Be, Zr, Cd, and a combination thereof, and wherein the polymer is selected from the group consisting of: low density polyethylene, high density polyethylene, polypropylene, polystyrene, polytetrafluoroethylene, polyvinylchloride, polychlorotrifluoroethylene, and a combination thereof.

3. The photovoltaic device of claim 1, wherein the radioactive nuclides are beta emitters, gamma emitters, or both.

4. The photovoltaic device of claim 3, wherein the beta emitters are selected from the group consisting of: $^{63}$Ni, $^{32}$Si, $^{151}$Sm, $^{90}$Sr, $^{66}$Cu, $^{209}$Pb, $^{145}$Pr, $^{127}$Te, $^{121}$Sn, $^{66}$Ni, $^{210}$Bi, $^{169}$Er, $^{143}$Pr, $^{32}$P, $^{89}$Sr, $^{91}$Y, $^{188}$W, $^{35}$S, $^{123}$Sn, $^{45}$Ca, $^{249}$Bk, $^{106}$Ru, $^{171}$Tm, $^{147}$Pm, $^{85}$Kr, $^{3}$H, $^{113m}$Cd, $^{241}$Pu, $^{42}$Ar, $^{39}$Ar, $^{14}$C, $^{99}$Tc, $^{79}$Se, $^{10}$Be, $^{135}$Cs, $^{107}$Pd, $^{187}$Re, $^{115}$In, $^{113}$Cd, and a combination thereof.

5. The photovoltaic device of claim 3, wherein the gamma emitters are selected from the group consisting of: $^{228}$Ac, $^{241}$Am, $^{124}$Sb, $^{125}$Sb, $^{126}$Sb, $^{137m}$Ba, $^{139}$Ba, $^{140}$Ba, $^{141}$Ba, $^{142}$Ba, $^{7}$Be, $^{211}$Bi, $^{213}$Bi, $^{213}$Bi, $^{214}$Bi, $^{82}$Br, $^{84}$Br, $^{11}$C, $^{47}$Ca, $^{141}$Ce, $^{143}$Ce, $^{144}$Ce, $^{134}$Cs, $^{134m}$Cs, $^{136}$Cs, $^{137}$Cs, $^{138}$Cs, $^{38}$Cl, $^{51}$Cr, $^{56}$Co, $^{57}$Co, $^{58}$Co, $^{60}$Co, $^{61}$Cu, $^{64}$Cu, $^{243}$Cm, $^{245}$Cm, $^{247}$Cm, $^{152}$Eu, $^{154}$Eu, $^{155}$Eu, $^{156}$Eu, $^{18}$F, $^{221}$Fr, $^{223}$Fr, $^{67}$Ga, $^{198}$Au, $^{166m}$Ho, $^{123}$I, $^{130}$I, $^{131}$I, $^{132}$I, $^{133}$I, $^{134}$I, $^{135}$I, $^{111}$In, $^{113m}$In, $^{192}$Ir, $^{59}$Fe, $^{85}$Kr, $^{85m}$Kr, $^{87}$Kr, $^{88}$Kr, $^{140}$La, $^{142}$La, $^{211}$Pb, $^{212}$Pb, $^{214}$Pb, $^{52}$Mn, $^{52m}$Mn, $^{54}$Mn, $^{56}$Mn, $^{203}$Hg, $^{99}$Mo, $^{147}$Nd, $^{237}$Np, $^{238}$Np, $^{239}$Np, $^{240}$Np, $^{57}$Ni, $^{65}$Ni, $^{95m}$Nb, $^{97}$Nb, $^{13}$N, $^{15}$O, $^{40}$K, $^{42}$K, $^{43}$K, $^{148}$Pm, $^{148m}$Pm, $^{149}$Pm, $^{151}$Pm, $^{231}$Pa, $^{233}$Pa, $^{234}$Pa, $^{233}$Ra, $^{224}$Ra, $^{226}$Ra, $^{219}$Rn, $^{105}$Rh, $^{106}$Rh, $^{103}$Rh, $^{89}$Rb, $^{105}$Ru, $^{97}$Ru, $^{153}$Sm, $^{44}$Sc, $^{47}$Sc, $^{46}$Sc, $^{48}$Sc, $^{75}$Se, $^{110}$Ag, $^{110m}$Ag, $^{111}$Ag, $^{22}$Na, $^{85}$Sr, $^{87m}$Sr, $^{91}$Sr, $^{92}$Sr, $^{101}$Tc, $^{99m}$Tc, $^{129}$Te, $^{129m}$Te, $^{131}$Te, $^{131m}$Te, $^{132}$Te, $^{133}$Te, $^{133m}$Te, $^{134}$Te, $^{135}$Te, $^{160}$Tb, $^{169}$Tb, $^{180}$Tb, $^{89}$Tb, $^{201}$Tl, $^{208}$Ti, $^{209}$Ti, $^{227}$Th, $^{229}$Th, $^{125}$Sn, $^{187}$W, $^{235}$U, $^{237}$U, $^{48}$V, $^{131m}$Xe, $^{133m}$Xe, $^{135}$Xe, $^{138}$Xe, $^{169}$Yb, $^{92}$Y, $^{93}$Y, $^{65}$Zn, and $^{97}$Zr and a combination thereof.

6. A photovoltaic device, comprising:
   a core comprising a composition including a homogeneous mixture of a material doped with radioactive nuclides to form a homogeneous doped material, wherein the homogeneous doped material absorbs a radiation emission from the radioactive nuclides and re-emits a photon, wherein the radioactive nuclides are beta emitters and the material is a fluorescent material, the core formed with an outer surface, wherein the homogeneous doped material is transparent to the photon; and
   an organic photovoltaic cell, wherein the core and the organic photovoltaic cell have a core-shell structure where the outer surface of the core is wrapped with the organic photovoltaic cell so that the entire core is within the organic photovoltaic cell and wherein the photovoltaic cell is disposed only on the outer surface of the core so that re-emitted photons produced by the homogeneous doped material are captured by the photovoltaic cell regardless of scattering angle.

7. The photovoltaic device of claim 6, wherein the fluorescent material is selected from the group consisting of: $ZnSiO_4$:Mn:$Sb_2O_3$, $SrB_4O_7$:Eu, (La,Ce)$PO_4$:Ce, (CeMg)$SrAl_{11}O_{18}$:Ce, (CeMg)$BaAl_{11}O_{18}$:Ce, $BaSi_2O_5$:Pb, (Y,Gd)$MgB_5O_{10}$:Ce,Pr, $La2O3$:Eu, (Y,Ce)$PO_4$:Ce, $BaMgAl_{16}O_{27}$:Eu:Mn, (La,Ce,Tb)$PO_4$:Ce:Tb, (Ce,Tb)$MgAl_{11}O_{19}$:Ce:Tb, $MgWO_4$, $Mg_4$(F)$GeO_6$:Mn, $CaWO_4$:Pb, (Ba,Ti)$_2P_2O_7$:Ti, $Sr_2P_2O_7$:Sn:Eu, $Sr_5F(PO_4)_3$:Sb:Mn, (Ba,Mg)$_2Al_{16}O_{27}$:Eu, $GdMgB_5O_{10}$:Ce:Tb, $YVO_4$:Bi:Eu, YAG:Ce:Cr:Nd (yttrium aluminum garnet), $MgSrAl_{10}O_{17}$:Eu:Cr, $BaMgAl_{10}O_{17}$:Eu, $Sr_5Cl(PO_4)_3$:Eu, $(Sr,Ba,Mg,Ca)_5Cl(PO_4)_3$:Eu, $Sr_6P_5BO_{20}$:Eu, $(Ca,Zn,Mg)_3(PO_4)_2$:Sn, $SrB_4O_7$:Sm:Eu, $(Sr,Mg)_3(PO_4)_2$:Sn, $CaSiO_3$:Pb:Mn, Cr—Yb doped fluorosilicate glass, $ZnO—LiYbO_2$, Yb doped glass ceramics containing ZnO nanocrystals, $LiYbMo_2O_8$:Pb, $CaLaGa_3S_6O$:Yb, Yb doped $LaSi_3N_5$, Ag—Yb co-doped oxyfluoride glasses, Yb-doped glass ceramics containing $YF_3$ nanocrystals, Cu doped glasses, Tb doped glasses, $LaVO_4$:Dy, Bi-doped oxide glasses, and a combination thereof.

8. The photovoltaic device of claim 7, further comprising a transparent material, wherein the homogeneous doped material is disposed within the transparent material, wherein the transparent material is transparent to photons, wherein the transparent material and the homogeneous doped material are not the same material.

9. The photovoltaic device of claim 8, wherein the transparent material is selected from: a glass or a polymer, wherein the glass is formed from a glass former selected from the group consisting of: B, Si, Ge, Al, B, P, V, As, Sb, Zr, and a combination thereof, or the glass is formed from an intermediate former selected from the group consisting of: Ti, Zn, Pb, Al, Th, Be, Zr, Cd, and a combination thereof, and wherein the polymer is selected from the group consisting of: low density polyethylene, high density polyethylene, polypropylene, polystyrene, polytetrafluoroethylene, polyvinylchloride, polychlorotrifluoroethylene, and a combination thereof.

10. The photovoltaic device of claim 1, wherein the radioactive nuclides are gamma emitters and the material is a fluorescent material.

11. The photovoltaic device of claim 10, wherein the fluorescent material is selected from the group consisting of: $LiBaF_3$, $KMgF_3$, $KCaF_3$, $KYF_4$, $BaLu_2F_8$, $BaF_2$, CsF, RbF, $CeF_3$, $BaY_2F_8$:Ce, $BaLu_2F_8$:Ce, $CaF_2$:Eu, $LaF_3$:Ce, $LuF_3$:Ce, $CsCaCl_3$, $Li_3YCl_6$, $Cs_2NaCeCl_6$, $Cs_2LiYCl_6$, $LiYCl_6$:Ce, $CeCl_3$:Ce, $LuCl_3$:Ce, $K_2LaCl_5$:Ce, $RbGd_2Cl_7$:Ce, $Cs_2LiYCl_6$:Ce, $Cs_2NaLaCl_6$:ce, $Cs_2NaLuCl_6$:Ce, $Cs_3LuCl_6$:Ce, $CsLu_2Cl_9$:Ce, $LaCl_3$:Ce, $LuBr_3$:Ce, $CeBr_3$, $RbGd_2Br_7$:Ce, $RbLu_2Br_7$:Ce, $LaBr_3$:Ce, CsI, $CaI_2$, $HgI_2$, NaI:Tl, CsI:Tl, CsI:Na, $CaI_2$:Eu, LiI:Eu, $BiI_3$, CdS:Te, $Gd_2O_2S$:Pr:Ce:F, $Lu_2S_3$:Ce, $Lu_2O_2S$:Ce, BeO, $Y_2O_3$, $Y_3Al_5O_{12}$, $YAlO_3$, $Sc_2SiO_5$, $NaZrSiO_5$, $Lu_3(Al,Sc)_5O_{12}$, $CdWO_4$, $ZnWO_4$, $CaWO_4$, $CdWO_4$, $PbWO_4$, $Bi_3Si_4O_{12}$, $Bi_3Ge_4O_{12}$, $LiLuSiO_4$:Ce, $Rb_3Lu(PO_4)_2$:Ce, $K_3Lu(PO_4)_2$:Ce, $Gd_3Sc_2Al_3O_{12}$:Ce, $Y_5Al_5O_{12}$:Ce, $Y_5Al_5O_{12}$:Pr, $Lu_3Al_5O_{12}$:Sc, $Lu_3Al_5O_{12}$:Ce, $Lu_3(Al—Sc)_3O_{12}$:Pr, $YAlO_3$:Ce, $YAlO_3$:Pr, $(Y,Lu)AlO_3$:Ce, $GdAlO_3$:Ce, $LuAlO_3$:Ce, $Y_2SiO_5$:Ce, $Y_2SiO_5$:Pr, $Gd_2SiO_5$:Ce, $Lu_2SiO_5$:Ce, $Lu_2Si_2O_7$:Ce, $La_2Be_2O_5$:Ce, $LuBO_3$:Ce, $Li_6Gd(BO_3)_3$:Ce, plastic/organic scintillators, and a combination thereof.

12. The photovoltaic device of claim 11, further comprising a transparent material, wherein the homogeneous doped material is disposed within the transparent material, wherein the transparent material is transparent to photons, wherein the transparent material and the homogeneous doped material are not the same material.

13. The photovoltaic device of claim 12, wherein the transparent material is selected from: a glass or a polymer, wherein the glass is formed from a glass former selected from the group consisting of: B, Si, Ge, Al, B, P, V, As, Sb, Zr, and a combination thereof, or the glass is formed from an intermediate former selected from the group consisting of: Ti, Zn, Pb, Al, Th, Be, Zr, Cd, and a combination thereof, and wherein the polymer is selected from the group consisting of: low density polyethylene, high density polyethylene, polypropylene, polystyrene, polytetrafluoroethylene, polyvinylchloride, polychlorotrifluoroethylene, and a combination thereof.

14. The photovoltaic device of claim 1, wherein the homogeneous doped material is a doped micromaterial or a doped nanomaterial.

15. The photovoltaic device of claim 1, wherein the organic photovoltaic cell has a plurality of layers comprising: a transparent electrode layer and a conductive electrode layer, wherein at least two component layers are sandwiched between the transparent electrode layer and conductive electrode layer.

16. The photovoltaic device of claim 15, wherein the at least two component layers comprise: an organic donor material layer and an acceptor material layer.

17. The photovoltaic device of claim 15, wherein each layer of the plurality of layers of the organic photovoltaic cell has a thickness of about 10 μm or less.

* * * * *